US012607509B2

(12) United States Patent
Kaajakari

(10) Patent No.: US 12,607,509 B2
(45) Date of Patent: Apr. 21, 2026

(54) INTERFEROMETER WITH ABSORBING LAYER

(71) Applicant: Murata Manufacturing Co., Ltd., Nagaokakyo (JP)

(72) Inventor: Ville Kaajakari, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 217 days.

(21) Appl. No.: 18/517,699

(22) Filed: Nov. 22, 2023

(65) Prior Publication Data

US 2024/0175671 A1     May 30, 2024

(30) Foreign Application Priority Data

Nov. 25, 2022   (EP) ..................................... 22209598
Dec. 20, 2022   (EP) ..................................... 22214975

(51) Int. Cl.
| | |
|---|---|
| *G01J 3/26* | (2006.01) |
| *G01J 3/02* | (2006.01) |
| *G01J 3/453* | (2006.01) |
| *G01N 21/3504* | (2014.01) |
| *G02B 26/00* | (2006.01) |

(52) U.S. Cl.
CPC .............. *G01J 3/26* (2013.01); *G01J 3/0256* (2013.01); *G01J 3/4535* (2013.01); *G02B 26/001* (2013.01); *G01N 21/3504* (2013.01)

(58) Field of Classification Search
CPC .......... G01J 3/0526; G01J 3/26; G01J 3/4535; G02B 26/001; G01N 21/3504
See application file for complete search history.

(56) References Cited

U.S. PATENT DOCUMENTS

| | | | | |
|---|---|---|---|---|
| 5,550,373 | A | 8/1996 | Cole et al. | |
| 5,589,689 | A | 12/1996 | Koskinen | |
| 5,646,729 | A | 7/1997 | Koskinen et al. | |
| 7,378,655 | B2 * | 5/2008 | Tai ........................... | G01J 3/26 |
| | | | | 250/338.1 |
| 2008/0035846 | A1 * | 2/2008 | Talghader ............. | G01J 5/0893 |
| | | | | 250/338.1 |
| 2009/0040616 | A1 | 2/2009 | Lin et al. | |
| 2015/0369663 | A1 * | 12/2015 | Margalit ................. | F25B 21/02 |
| | | | | 62/3.2 |
| 2017/0309758 | A1 * | 10/2017 | Frey ........................ | G01J 5/045 |
| 2019/0265163 | A1 | 8/2019 | Johansen | |

(Continued)

FOREIGN PATENT DOCUMENTS

| | | |
|---|---|---|
| DE | 69511488 T2 | 4/2000 |
| DE | 102020205599 A1 | 11/2021 |

(Continued)

*Primary Examiner* — Michael A Lyons
(74) *Attorney, Agent, or Firm* — ArentFox Schiff LLP

(57) ABSTRACT

A micromechanical Fabry-Perot interferometer is provided that includes an at least partly transparent substrate; an illuminated area where the light is passed through the substrate; a reflector on the top surface of the substrate in the illuminated area; an absorbing reflector layer above the reflector in the illuminated area, which absorbs at least some wavelengths of the infrared light; an arrangement for determining the temperature of the absorbing reflector layer; and at least one actuator to adjust the gap between the reflector and the absorbing reflector layer.

22 Claims, 9 Drawing Sheets

(56)         References Cited

U.S. PATENT DOCUMENTS

| | | | |
|---|---|---|---|
| 2021/0262858 A1 | 8/2021 | Noltemeyer et al. | |
| 2022/0357200 A1 * | 11/2022 | D'Aleo | ................. G01J 3/0286 |
| 2023/0341743 A1 | 10/2023 | Guo | |

FOREIGN PATENT DOCUMENTS

| | | | |
|---|---|---|---|
| EP | 1640694 | A2 | 3/2006 |
| EP | 1640694 | A3 | 7/2006 |
| JP | 2016007692 | A | 1/2016 |
| WO | 2021077396 | A1 | 4/2021 |

\* cited by examiner

1

INTERFEROMETER WITH ABSORBING LAYER

CROSS REFERENCE TO RELATED APPLICATIONS

This application claims priority to European Patent Application No. 22209598.6, filed Nov. 25, 2022, and European Patent Application No. 22214975.9, filed Dec. 20, 2022, the contents of each of which are hereby incorporated by reference in their entireties.

TECHNICAL FIELD

The disclosure relates to an interferometer, and, more particularly, to the interferometer with an arrangement for determining the intensity of light.

BACKGROUND

Micromechanical Fabry-Perot interferometers typically comprise a first mirror that is suspended above a second mirror that lies on a substrate. The two mirrors are separated from each other by a gap so that an optical cavity is formed between them. At least the second mirror is at least partly transparent, so that electromagnetic radiation can enter the optical cavity from one side. If the first mirror is also at least partly transparent, the radiation can exit it from the other side. The light that enters the optical cavity can undergo multiple reflections between the first and the second mirrors before it is transmitted out of the cavity. A wavelength at which constructive interference occurs is transmitted through the first mirror and can then be detected by, for example, a bolometer.

Micromechanical interferometers can measure (near-)infrared light, visible light or ultraviolet light. By adjusting the optical tuning gap, the measured wavelength can be defined. A common application is $CO_2$ detection that is based on measuring infrared light absorption at different wavelengths. $CO_2$ has strong absorption peak at wavelength of 4.2-4.3 um. By measuring light intensity at this specific wavelength after the light has penetrated a gas sample, the $CO_2$ concentration in the gas sample can be deduced.

U.S. Pat. No. 5,589,689 describes a Fabry Perot interferometer combined with an integrated infrared sensor that can detect the certain wavelength of infrared radiation, which undergoes constructive interference between the two mirrors. However, it requires complicated integration of the sensor during manufacturing process. Thus, the interferometer with more elegant infrared absorption solution is required.

SUMMARY OF THE INVENTION

Accordingly, it is an object of the present disclosure is to provide an interferometer to alleviate the above disadvantages. In particular, an interferometer is provided in an exemplary aspect that includes a substrate having a top surface and a bottom surface that oppose each other, the substrate being at least partly transparent; a reflector on the top surface of the substrate in an illuminated area where incoming electromagnetic radiation is passed through the substrate from the bottom surface to the top surface of the substrate; an absorbing reflector layer above the reflector and that is parallel to the reflector and faces the reflector in the illuminated area, the absorbing reflector layer including a top and a bottom surface that oppose each other and being configured to absorb at least some wavelengths of the electromagnetic radiation; an arrangement configured to determine a temperature of the absorbing reflector layer; and an actuator in an actuation area that is configured to adjust a gap between the reflector and the absorbing reflector layer.

In another exemplary aspect, an interferometer is provided that includes a substrate that is at least partly transparent; a reflector on the substrate in an illuminated area where incoming electromagnetic radiation is passed through the substrate; an absorbing reflector layer that is parallel to the reflector and faces the reflector in the illuminated area, the absorbing reflector layer configured to absorb at least some wavelengths of the electromagnetic radiation; an arrangement configured to determine a temperature of the absorbing reflector layer; and an actuator configured to adjust a gap between the reflector and the absorbing reflector layer.

In yet another exemplary aspect, a carbon dioxide sensor is provided that includes either of the interferometers disclosed herein.

In yet another exemplary aspect, a method is provided for detecting infrared light with an interferometer that includes a partly transparent substrate, a reflector on the substrate in an illuminated area where incoming electromagnetic radiation is passed through the substrate, an absorbing reflector layer above the reflector and configured to absorb at least some wavelengths of the electromagnetic radiation, an arrangement configured to determine a temperature of the absorbing reflector layer, and an actuator configured to adjust a gap between the reflector and the absorbing reflector layer. In this aspect, the method includes illuminating the absorbing reflector layer so that the infrared light enters from a bottom surface of the substrate to a bottom side of absorbing reflector layer; and determining the temperature of the absorbing reflector layer.

The exemplary aspects of the present disclosure are based on the idea of: (a) using absorbing reflector layer as one of the mirrors of the interferometer, wherein the absorbing reflector layer absorbs the entering light in contrast to conventional interferometers where the light passes the mirror, and (b) determining the temperature of the absorbing reflector layer.

An advantage of the interferometer of the exemplary aspects of the disclosure is that absorbing reflector layer absorbs the electromagnetic radiation, and no separate detector is required. Additionally multiple wavelengths can be detected due to adjustable gap between the reflector and the absorbing reflector layer.

BRIEF DESCRIPTION OF THE DRAWINGS

In the following the disclosure will be described in greater detail by means of exemplary embodiments with reference to the accompanying drawings, in which.

Figure 4A:
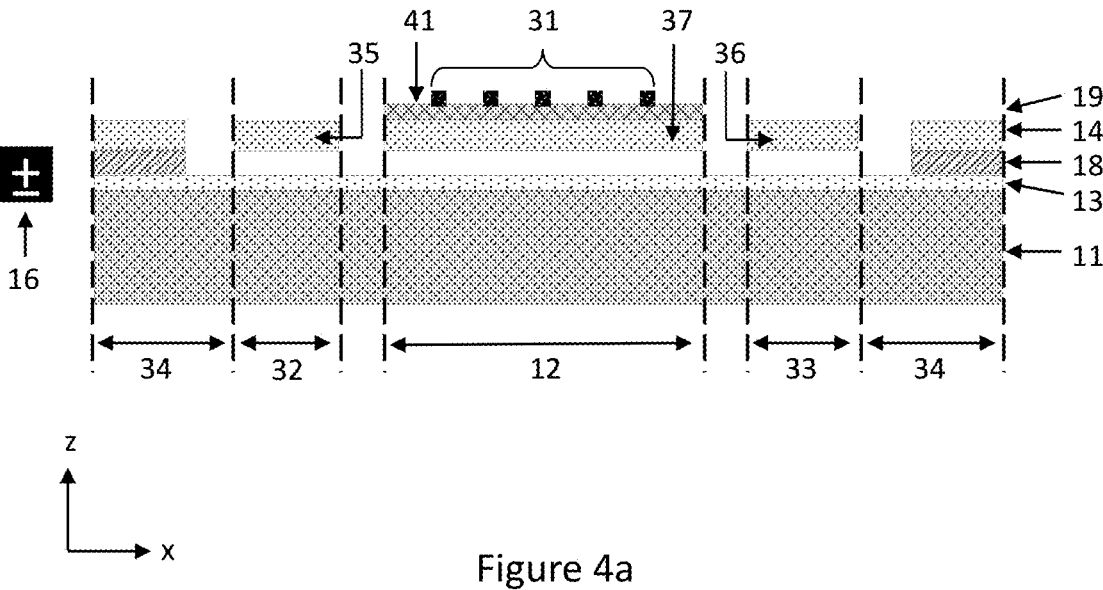
FIG. 4a is a side view of the interferometer with the absorbing reflector support and the thermistor as an arrange-
Figure 4B:
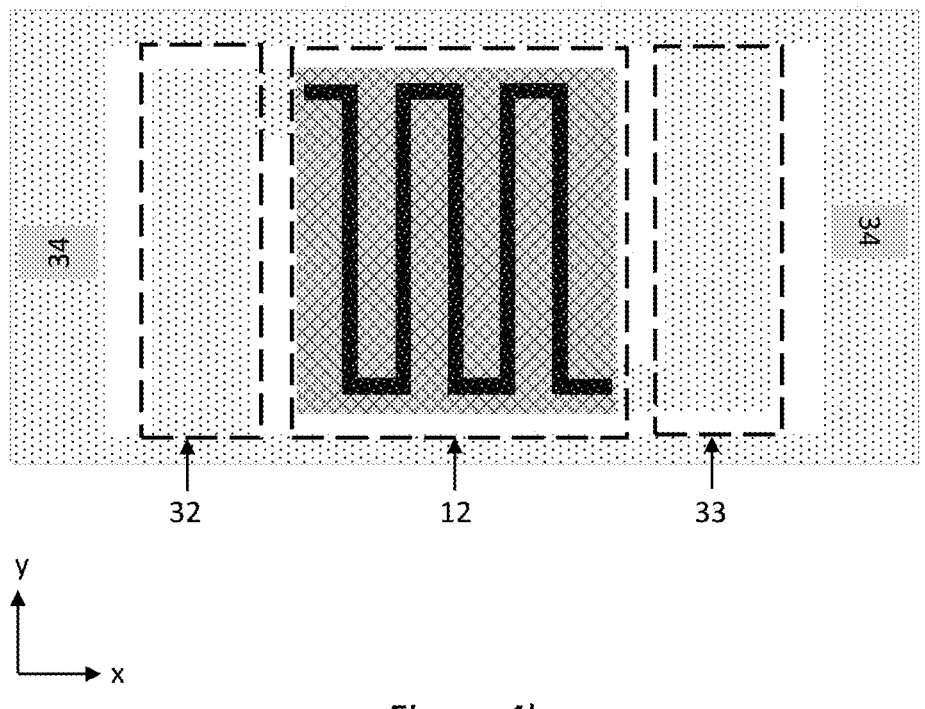
Figure 5A:
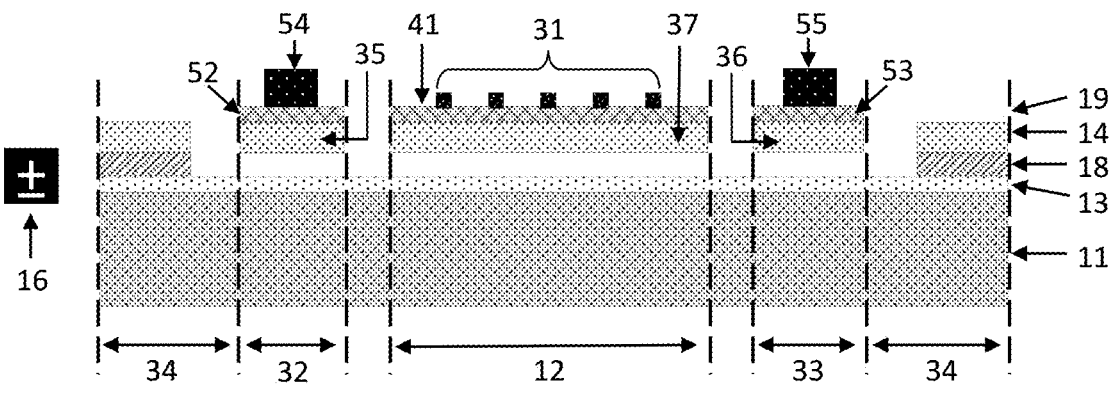
Figure 5A:
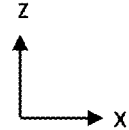
Figure 5B:
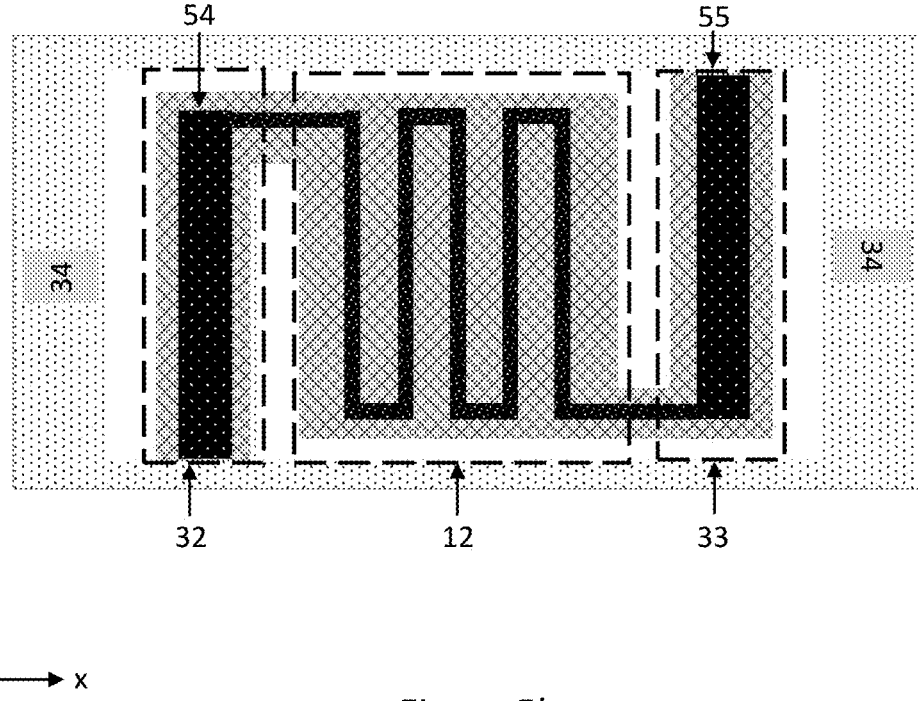
Figure 6A:
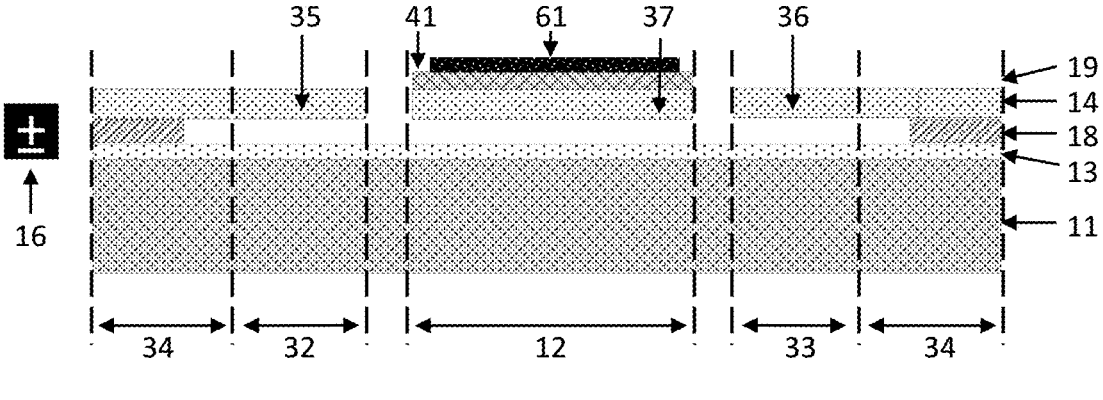
Figure 6A:
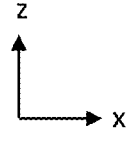
Figure 6B:
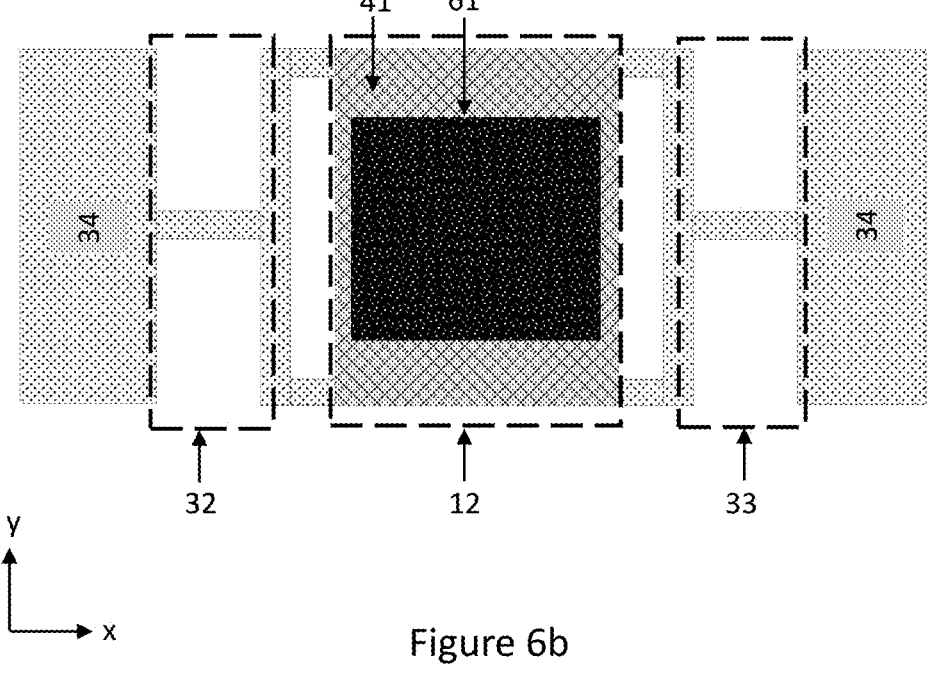
Figure 6C:
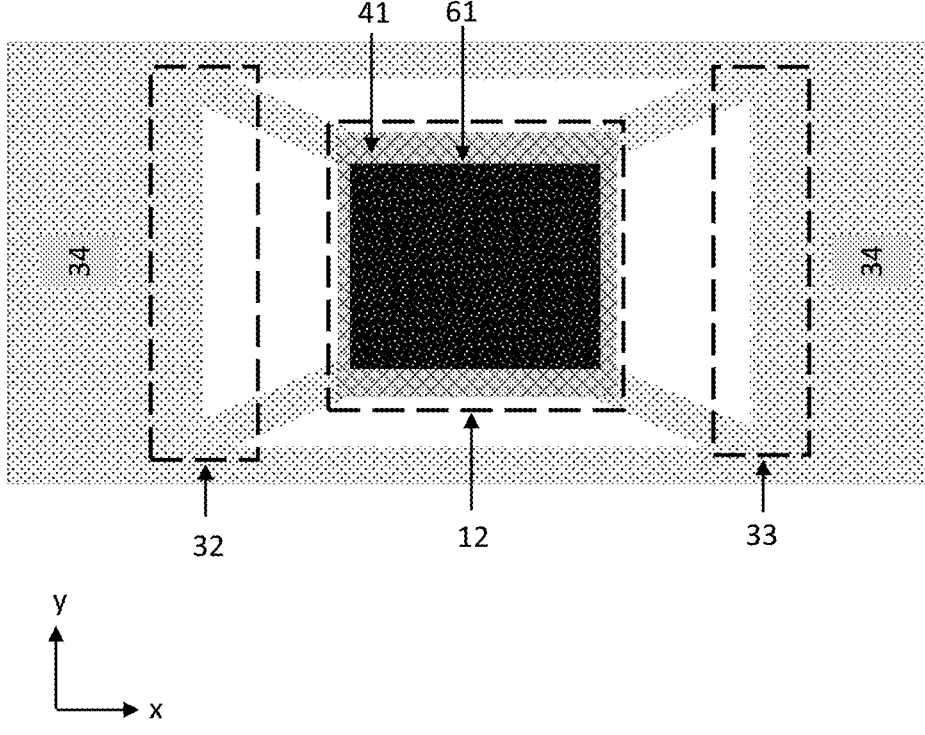
Figure 7A:
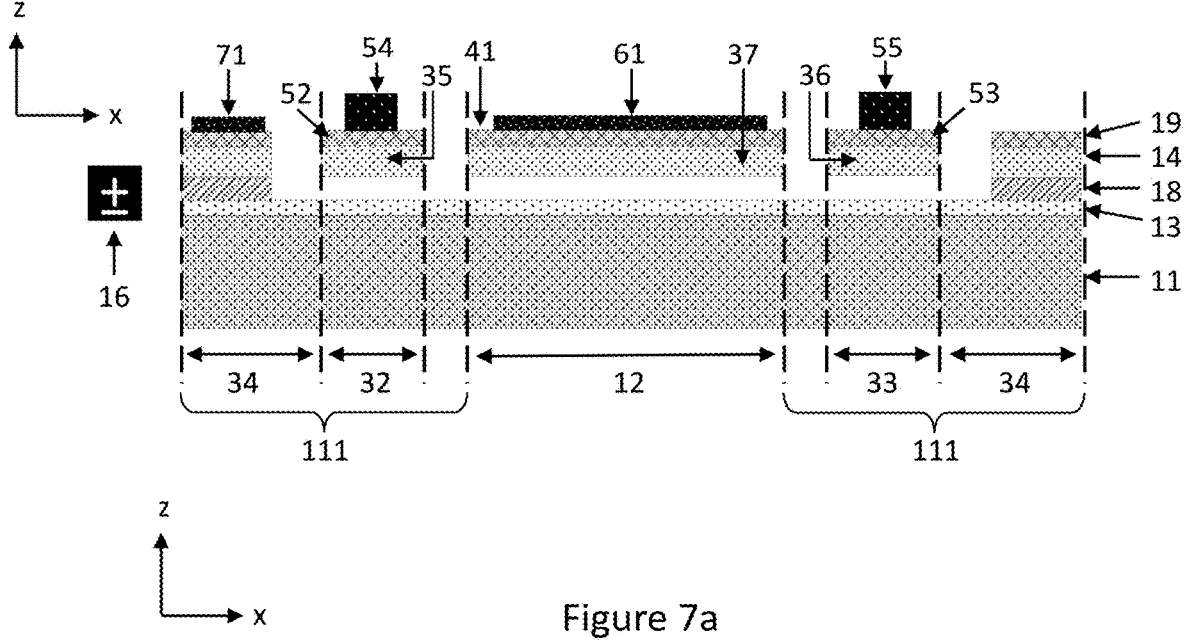
Figure 7B:
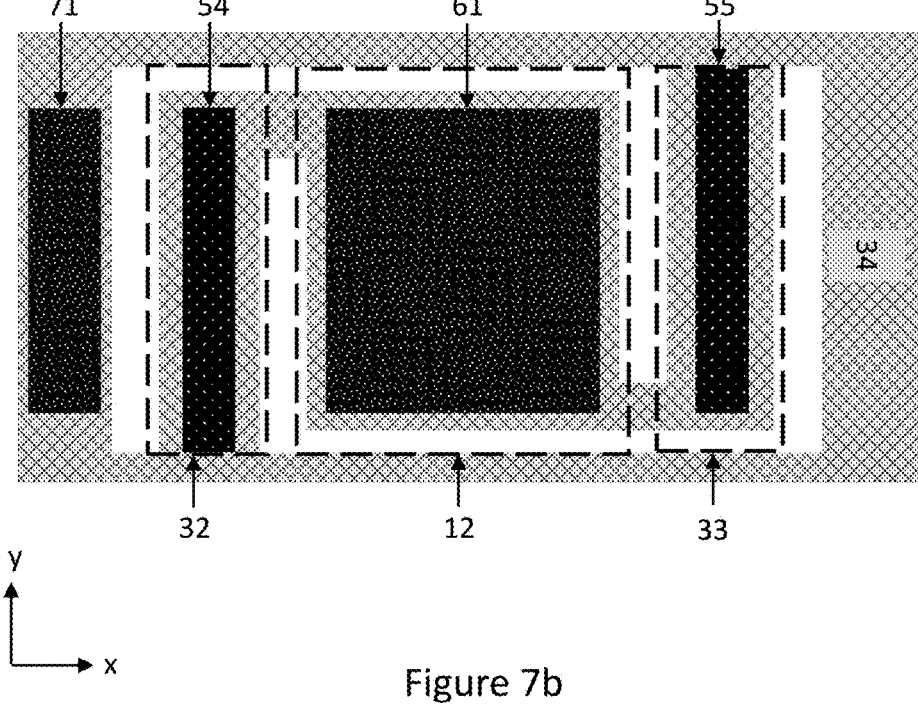
Figure 8:
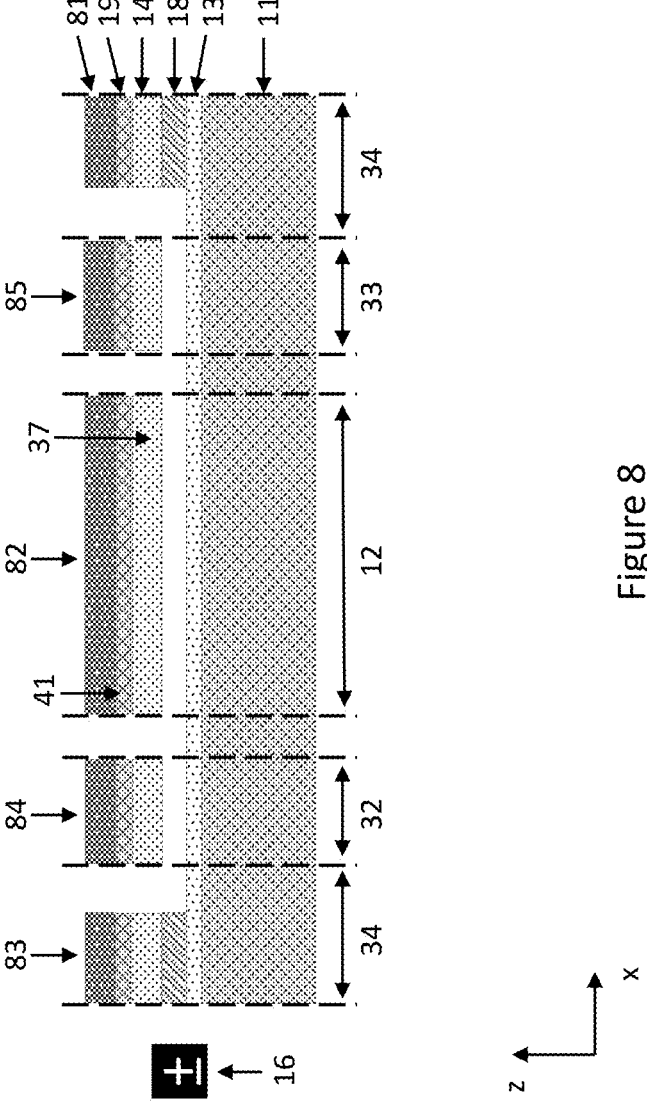

3 ment for determining the temperature of the absorbing reflector according to an exemplary aspect;

FIG. 4b is a top view of the interferometer with the absorbing reflector support and the thermistor as an arrangement for determining the temperature of the absorbing reflector according to an exemplary aspect;

FIG. 5a is a side view of the interferometer with piezoelectric actuator and the thermistor as an arrangement for determining the temperature of the absorbing reflector according to an exemplary aspect;

FIG. 5b is a top view of the interferometer with piezoelectric actuator and the thermistor as an arrangement for determining the temperature of the absorbing reflector according to an exemplary aspect;

FIG. 6a is a side view of the interferometer of alternative geometry with capacitive actuator and the sensing electrode as an arrangement for determining the temperature of the absorbing reflector according to an exemplary aspect;

FIG. 6b is a top view of the interferometer of the first alternative geometry with capacitive actuator and the sensing electrode as an arrangement for determining the temperature of the absorbing reflector according to an exemplary aspect;

FIG. 6c is a top view of the interferometer of the second alternative geometry with capacitive actuator and the sensing electrode as an arrangement for determining the temperature of the absorbing reflector according to an exemplary aspect;

FIG. 7a is a side view of the interferometer with piezoelectric actuator and the sensing and reference electrodes as an arrangement for determining the temperature of the absorbing reflector according to an exemplary aspect;

FIG. 7b is a top view of the interferometer with piezoelectric actuator and the sensing and reference electrodes as an arrangement for determining the temperature of the absorbing reflector according to an exemplary aspect; and FIG. 8 illustrates the interferometer with a silicon wafer on top of the piezoelectric supporting layer according to an exemplary aspect.

Figure 9:
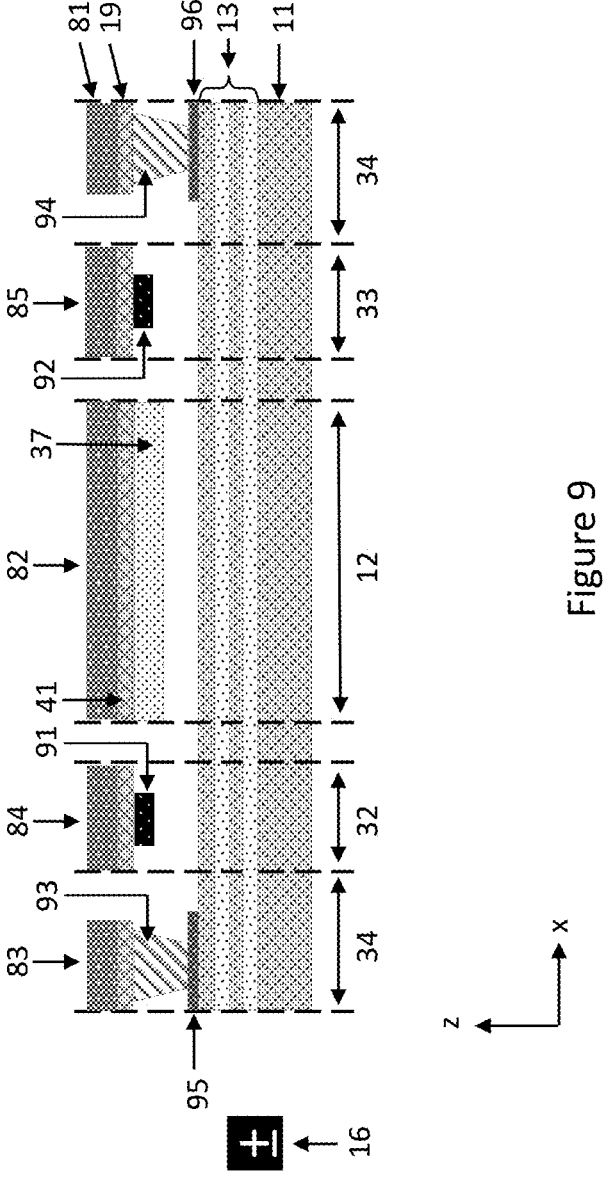

FIG. 9 illustrates another example of the interferometer with a silicon wafer on top of the piezoelectric supporting layer.

DETAILED DESCRIPTION

According to an exemplary aspect, a microelectromechanical Fabry-Perot interferometer is provided that includes an at least partly transparent substrate, which comprises a top surface and a bottom surface; an illuminated area where incoming electromagnetic radiation is passed through the substrate from the bottom surface to the top surface of the substrate; reflector on the top surface of the substrate in the illuminated area; an absorbing reflector layer above the reflector, wherein the absorbing reflector layer is parallel to the reflector and faces the reflector in the illuminated area, and the absorbing reflector layer comprises a top and a bottom surface, and the absorbing reflector layer absorbs at least some wavelengths of electromagnetic radiation; an arrangement for determining the temperature of the absorbing reflector layer; and an actuation area and an actuator in the actuation area, wherein the actuator is configured to adjust the gap between the reflector and the absorbing reflector layer.

Figure 1:
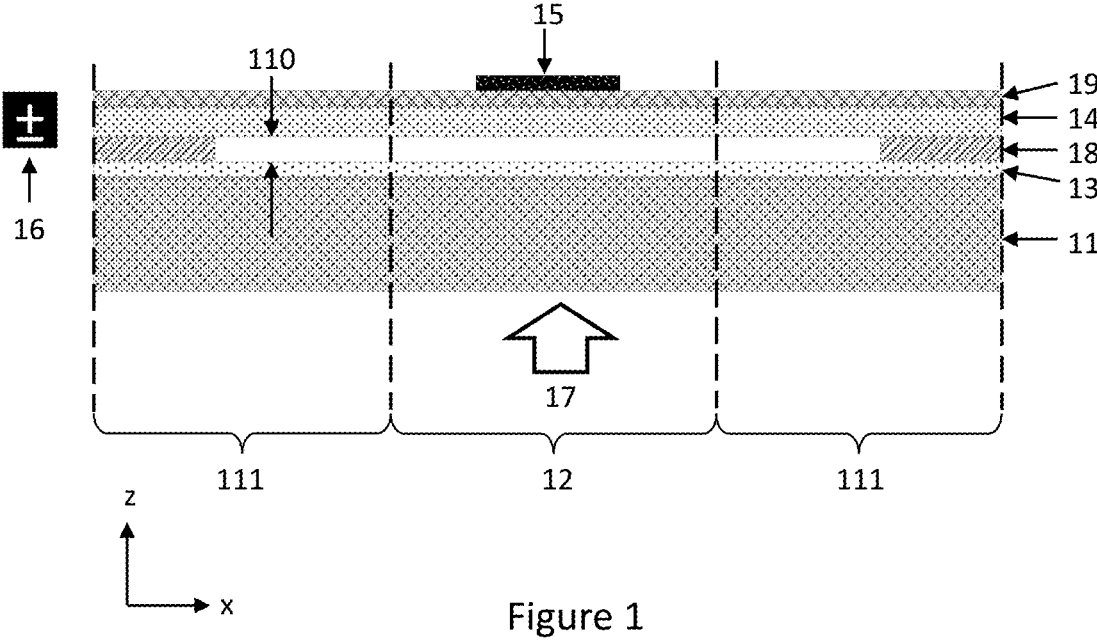
FIG. 1 illustrates a general schematic of the interferometer according to an exemplary aspect.

As illustrated in FIG. 1, the interferometer comprises a substrate 11 that is configured with a top surface and a bottom surface. The top surface and the bottom surface are located on the opposite sides of the substrate and are parallel to each other. The respective surfaces of the substrate define a horizontal plane and a vertical direction that is perpendicular to the horizontal plane. The horizontal plane corresponds to x-y-axes plane (not shown in FIG. 1) and the vertical direction corresponds to z-axis. The substrate can be made of a material such as glass, quartz or silicon, which can pass light of the certain wavelength according to an exemplary aspect.

The illuminated area 12 is a region of the interferometer, which incoming light 17 illuminates. The light 17 passes through the substrate from the bottom surface to the top surface. The light path may be perpendicular to the substrate 11, thus the illuminated area 12 may also be perpendicular to the substrate and to all other structures of the interferometer discussed below. The light may be in infrared wavelength range, thus called infrared (IR) light or radiation, but may also be in non-infrared wavelength range, for example, in visible, near IR or ultraviolet range.

The area that is not illuminated can be called a non-illuminated area 111. The non-illuminated area 111 may further comprise other areas such as the actuation areas (not shown in FIG. 1) where the actuator is located.

The reflector 13 is a layer located on the top surface of the substrate 11. The reflector 13 is configured to transmit the light 17 when it passes from the bottom to the top surface of the substrate 11 and reflect the light when it is reflected back downward from the absorbing reflector layer 14. The reflector 13 and the absorbing reflector layer 14 can thereby form an optical cavity where some light wavelengths undergo constructive interference. The light that undergoes constructive interference may be absorbed in the absorbing reflector layer 14. The reflector 13 can be a thin metal film, such as silver, or an alternating sequence of layers of two different optical materials also called a Bragg mirror as discussed later. The reflector 13 can also be called the first mirror.

The absorbing reflector layer 14 is located above the reflector 13, is facing the reflector and is parallel to the reflector in the illuminated area 12. The absorbing reflector layer 14 is configured with a bottom surface that faces the reflector 13, and a top surface that lies on the opposite side on the absorbing reflector. The absorbing reflector layer 14 can also be called the second mirror. The region of the absorbing reflector layer 14 in the illuminated area 12 can be called an absorbing reflector (not defined in FIG. 1). The absorbing reflector layer 14 may be a thin metal film of lossy metal material. The lossy material may be defined as material that dissipates energy of electromagnetic wave passing through it. In an exemplary aspect, the lossy metal material may be silver, aluminium or gold. Moreover, the thickness of the absorbing reflector layer 14 can be between 10 nm and 100 nm, or greater than 10 nm, or greater than 20 nm, or greater than 50 nm, or greater than 70 nm, or greater than 90 nm, for example. The thickness can also be greater than 100 nm, but it may not further improve light absorption capability of the absorbing reflector layer.

A supporting layer 19 may be attached to the top surface of the absorbing reflector layer 14. The supporting layer 19 may partially or fully cover the top surface of the absorbing reflector layer 14 and comprise several regions. The regions of the supporting layer 19 may be made from the same material or different materials. The function of the supporting layer 19 may be to a) hold the absorbing reflector layer 14 in order to improve the mechanical strength of the structure, and/or b) to enable actuation and movement of the absorbing reflector layer 14 when the material and the design of the supporting layer are suitably selected.

According to an exemplary aspect, the interferometer is configured with the at least one spacer 18, which separates the reflector 13 from the absorbing reflector layer 14 in the vertical direction and defines the optical cavity and a gap 110 between them. The spacer 18 may be patterned from dielectric material such as silicon dioxide or a polymer.

According to an exemplary aspect, the interferometer further comprises an arrangement 15 for determining the temperature of the absorbing reflector layer 14, located in the illuminated area 12, as described in more detail in the embodiments below. The arrangement 15 may be attached directly to the absorbing reflector layer 14 or to the supporting structure 19. The arrangement 15 may also be in contact with other elements of the interferometer.

Absorbing Mechanism

Figure 2:
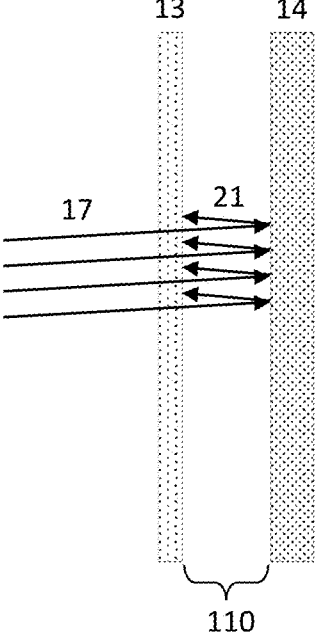
FIG. 2 shows the path of the light between the reflector and the absorbing reflector of the interferometer according to an exemplary aspect.

The absorbing reflector layer 14 absorbs at least part of the light 17 that is transmitted through the substrate 11 and the reflector 13 and undergoes constructive interference in the optical cavity 110 as illustrated in FIG. 2. At least portion of the absorbing reflector layer 14 is lossy and absorbs light. Suitable lossy materials include metals and other conductors that effectively absorb the entering light. The light absorbed in the absorbing reflector layer 14 heats it. The heating power raises the temperature until it is balanced by the heat loss exiting the absorbing reflector layer 14 due heat conduction. The time constant for reaching constant temperature is typically less than 1 s, for example. Thus, by measuring the temperature change of the absorbing reflector layer 14, the amount of the absorbed light at a specific moment can be determined. The portion of light 21, which is not absorbed by the absorbing reflector, gets reflected back to the reflector 13.

The gap 110 between the reflector 13 and the absorbing reflector layer 14 defines the wavelength of light that undergoes constructive interference in the optical cavity and is absorbed by the absorbing reflector layer 14. In other words, the adjustment of the width of the gap 110 enables absorption of different wavelengths.

Actuation

According to an exemplary aspect, the interferometer comprises an actuation area (not defined in FIG. 1) and an actuator 16 in the actuation area, wherein the actuator is configured to adjust the gap between the reflector 13 and the absorbing reflector layer 14. In the embodiments described below, the interferometer further comprises two or more actuation areas (not defined in FIG. 1) and an actuator 16 in each of the two or more actuation areas that is configured to adjust the gap 110 between the reflector 13 and the absorbing reflector layer 14. The gap 110 is adjusted by pulling in or pushing out the absorbing reflector layer 14 in relation to the reflector 13 in vertical direction and reducing or increasing the separation distance between them. The gap adjustment is reversible. At least two actuation methods may be implemented to achieve the gap adjustment: piezoelectric actuation and electrostatic actuation. Correspondingly, the actuator may be piezoelectric or electrostatic. Both actuation methods are discussed in more detail below and in regard to additional exemplary embodiments.

Figure 3A:
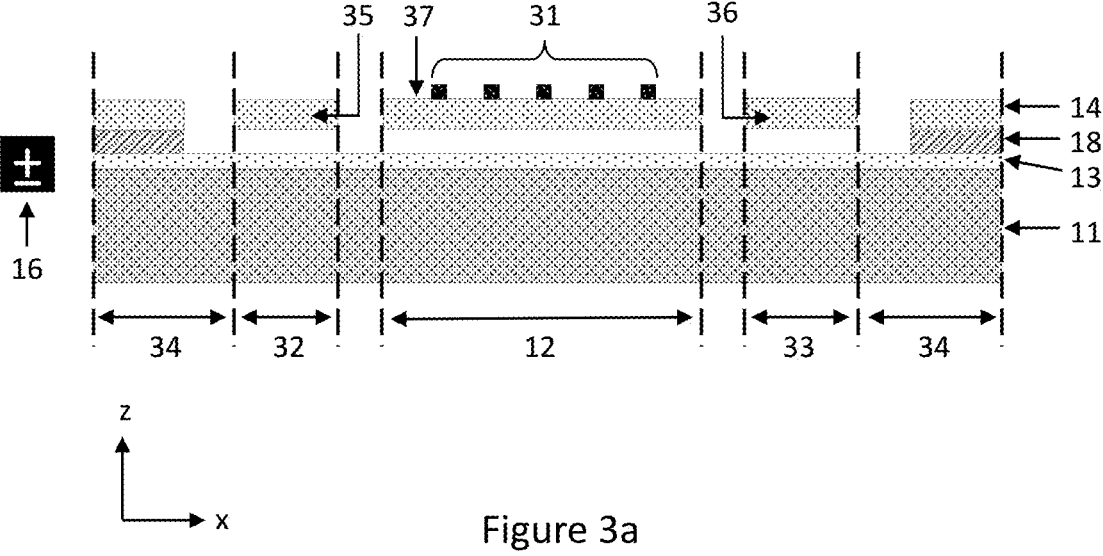
FIG. 3a is a side view of the interferometer with thermistor as an arrangement for determining the temperature of the absorbing reflector according to an exemplary aspect.
Figure 3B:
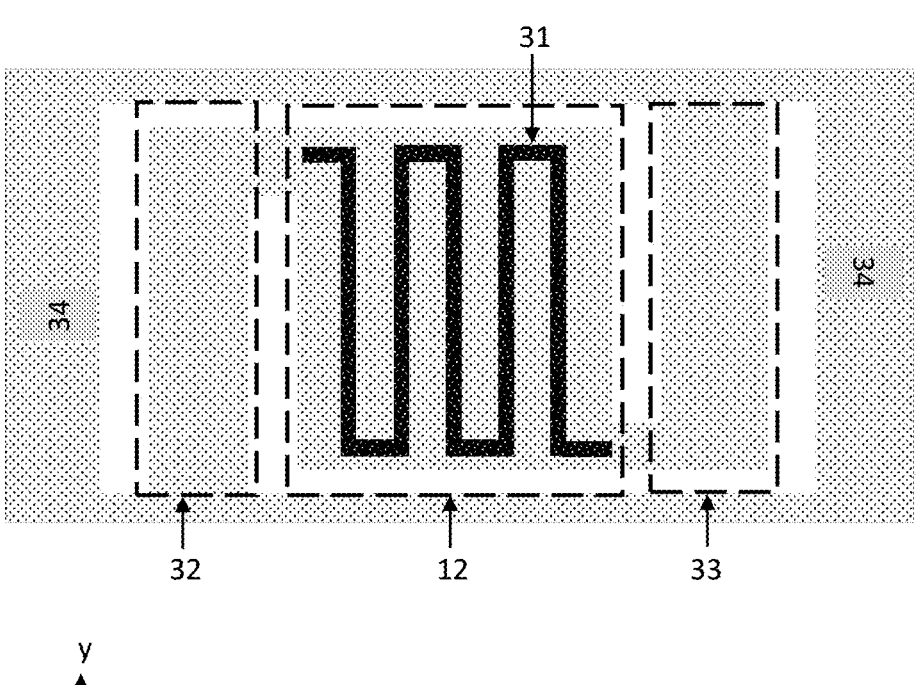
FIG. 3b is a top view of the interferometer with thermistor as an arrangement for determining the temperature of the absorbing reflector according to an exemplary aspect.

The absorbing reflector layer 14 and optional supporting layer 19 may be patterned as described in the additional exemplary embodiments. The patterning may be necessary for achieving the sufficient mobility of the absorbing reflector layer 14 and optional supporting layer 19 during actuation. For example, as illustrated in FIGS. 3a and 3b, the absorbing reflector layer 14 may be patterned to define at least the illuminated area 12 with the absorbing reflector 37, at least two actuation areas 32 and 33 and a fixed area 34 in the horizontal plane. Each of the at least two actuation areas 32 and 33 may extend from the fixed area 34 to the illuminated area 12, and the actuation areas 32 and 33 may be located on opposite sides of the illuminated area 12. The fixed area 34 may surround both the illuminated area 12 and the at least two actuation areas 32 and 33. Actuation induces vertical movement in the actuation areas 32 and 33, and this vertical movement also moves the absorbing reflector 37.

Thermistor as an Arrangement for Determining the Temperature

In the exemplary embodiments illustrated in FIGS. 3a-b, 4a-b and 5a-b, the arrangement for determining the temperature of the absorbing reflector may comprise a thermistor. The thermistor may be attached to the top surface of the absorbing reflector 37 in the illuminated area 12 as in FIGS. 3a and 3b. When the part of the incoming light 17, which undergoes constructive interference in the optical cavity, is absorbed by the absorbing reflector 37, the temperature of the absorbing reflector 37 increases. The temperature change may be determined using the thermistor 31 positioned on the top surface of the absorbing reflector 37. The thermistor 31 may be configured, for example, in a serpentine shape. The change of resistance may be measured from, for example, the ends of the thermistor 31. Alternatively, the at least two measuring electrodes may be deposited onto the absorbing reflector layer 14 in the illuminated area 12 or in the actuation areas 32 or 33 so that the measuring electrodes are in contact with the ends of the thermistor 31 (not shown in FIGS. 3a-3b). The change of the resistance indicates the change of the temperature, while the temperature change of the absorbing reflector 37 corresponds to the intensity of absorbed light. In other words, by measuring the resistance of the thermistor 31 attached to the absorbing reflector 37, the intensity of the light absorbed by the absorbing reflector 37 can be identified.

The supporting layer may be attached to the top surface of the absorbing reflector at least in the illuminated area, and the thermistor may be attached to the supporting layer in the illuminated area, as illustrated in FIGS. 4a and 4b. The part of the supporting layer 19 attached to the absorbing reflector 37 may be called absorbing reflector support 41. The absorbing reflector support 41 may be made from piezoelectric or non-piezoelectric material. The thermistor 31 may then be attached to the absorbing reflector support 41. The heat generated in the absorbing reflector 37 may be transferred to the absorbing reflector support 41 heating the thermistor 31 and changing its resistance. The change of resistance of the thermistor 31 may be measured from, for example, its ends. Alternatively, at least two measuring electrodes may be deposited onto the absorbing reflector support 41 so that the measuring electrodes are in contact with the ends of the thermistor 31 in the illuminated area 12 or in the actuation areas 32 and 33 (not shown in FIGS. 4a-4b).

In the interferometer with thermistor-based arrangement for determining the temperature, the supporting layer may be at least in the actuation area and said supporting layer may be piezoelectric. Further, the actuator 16 may be piezoelectric, as shown in FIGS. 5a and 5b. The supporting layer 19 may be attached to the absorbing reflector layer 14 in the actuation areas 32 and 33. The supporting layer 19 may extend from the illuminated area 12 to the actuation areas 32 and 33. The parts of the supporting layer 19 that lie in the actuation areas can be called actuator supports 52 and 53. The actuator supports 52 and 53 may be made from piezoelectric material such as lithium niobate, lithium tantalite, lithium tantalite oxide, aluminium nitrate or lead zirconate titanate oxide (PZT). Any other material with a strong piezoelectric coupling coefficient may also be used. The use of crystalline materials such as lithium niobate and lithium tantalite are especially advantageous as they have predictable material characteristics and a large piezoelectric coefficient. The typical thickness for the piezoelectric supporting layer may be 1-5 um. The supporting layer 19 may or may not be attached to the absorbing reflector 37. Optionally, the supporting layer 19 may also be attached to the absorbing reflector layer 14 in the fixed area 34 and extend, for example, from the illuminated area 12 to the actuation areas 32 and 33 and from the actuation areas 32 and 33 to the fixed area 34. In that case, the supporting layer 19 in the fixed area 34 may be made from piezoelectric or non-piezoelectric material.

According to an exemplary aspect, the first piezoelectric actuation electrodes 54 and 55 may be attached to each actuation support 52 and 53. The first piezoelectric actuation electrodes 54 and 55 can be made of electrically conductive material, for example, aluminium. The absorbing reflector layer 14 in the actuation areas 32 and 33 may be configured as the second actuation electrodes 35 and 36 located on the bottom of the actuation supports 52 and 53. In other words, the actuator supports 52 and 53 are to be between the first piezoelectric actuation electrodes 54 and 55 and the second actuation electrodes 35 and 36 in the vertical direction. The first piezoelectric actuation electrodes 54 and 55 can also be in contact with the ends of the thermistor 31 as measurement electrodes for determining its resistance.

In operation, the movement in the actuation areas 32 and 33 in the vertical direction can be activated by applying the voltage between the first piezoelectric actuation electrodes 54 and 55 and the second actuation electrodes 35 and 36. The movement in the actuation areas 32 and 33 is the out-of-plane bending in positive or negative z-direction depending on the polarity of the applied voltage. The direction of the movement of the absorbing reflector 37 follows the direction of the movement in the actuation areas 32 and 33.

In the interferometer with thermistor-based arrangement for determining the temperature illustrated in FIGS. 3a-3b, 4a-4b and 5a-5b, the actuator may be electrostatic. For electrostatic actuation, the reflector 13 and the absorbing reflector layer 14 may form a capacitive actuator in each of the two or more actuator areas 32 and 33. The supporting layer 19 may be attached to the absorbing reflector layer 14 in some areas or all areas. In other words, the supporting layer 19 may be in the illuminated area 12, the actuator areas 32 and 33 and the fixed area 34 or in some of these areas. However, there may be no supporting layer 19 at all. The supporting layer 19 may be made partially or fully from piezoelectric, pyroelectric or non-pyroelectric material. The electrostatic actuation may also be called capacitive actuation.

The absorbing reflector layer 14 and the optional supporting layer 19 may be patterned, to define the illuminated area 12, the fixed area 34 and the at least two actuation areas 32 and 33 in the horizontal plane. Each of the at least two actuation areas 32 and 33 may extend from the fixed area 34 to the illuminated area 12, and the actuation areas 32 and 33 may be located on the opposite sides of the illuminated area 12. The fixed area 34 may surround both the illuminated area 12 and the at least two actuation areas 32 and 33.

The reflector 13 may form the first electrostatic actuation electrodes on the surface of the substrate. If the reflector 13 has multiple layers (e.g., Bragg mirror as described below), the topmost layer of it may be used as the electrostatic actuation electrodes. The patterned absorbing reflector in the actuation areas 32 and 33 may form the second actuation electrodes 35 and 36 on the other side of the gap. The movement of the actuation areas in the vertical direction can be activated by applying a voltage between the second actuation electrodes 35 and 36 and the first electrostatic actuation electrodes. The direction of the movement of the absorbing reflector 37 follows the direction of the movement in the actuation areas 32 and 33.

Pyroelectricity Measurement

As discussed above, the supporting layer 19 in some areas can be made of a piezoelectric material as in FIGS. 5a and 5b. Further, the supporting layer 19 in some areas can be made of a pyroelectric material. One property of the piezoelectric and pyroelectric materials is pyroelectricity. For example, the absorbing reflector support 41 may be piezoelectric or pyroelectric. In that case, when the light is absorbed by the absorbing reflector 37, the temperature of the absorbing reflector 37 and the attached absorbing reflector support 41 increases. When the absorbing reflector support 41 is made of piezoelectric or pyroelectric material, the increase of its temperature may lead to the change in polarization and charge accumulation in the opposite surfaces of the piezoelectric layer, resulting in the pyroelectric potential. Thus, the pyroelectric potential can be used to determine the temperature and deduce the intensity of the absorbed light. In other words, when the absorbing reflector support 41 is made of the piezoelectric or pyroelectric material, the variation of its pyroelectric potential may be used to determine the amount of the absorbed light by the absorbing reflector 37.

Pyro Electrode as an Arrangement for Determining the Temperature

As illustrated in FIGS. 6a, 6b and 6c, the supporting layer may be attached to the absorbing reflector layer at least in the illuminated area and said supporting layer may be pyroelectric. The arrangement for determining the temperature of the absorbing reflector layer may comprise a sensing electrode attached to the supporting layer in the illuminated area.

The sensing electrode 61 may be attached to the absorbing reflector support 41. The absorbing reflector support 41 may be pyroelectric. The absorbing reflector support 41 may also be piezoelectric. The sensing electrode 61 may be configured to measure the change of the pyroelectric potential in the absorbing reflector support 41 in response to the absorption of the light by the absorbing reflector 37. The absorbed light heats the absorbing reflector support 41 generating electric polarization. The pyroelectric polarization may be sensed as pyroelectric potential between the top and the bottom surfaces of the absorbing reflector support 41. For the measurement of the pyroelectric potential, the absorbing reflector 37 may be used as bottom electrode and the sensing electrode 61 may be used as the top electrode. The pyroelectric potential may also be sensed by measuring the charge or current between the top and the bottom electrodes.

In order to further improve the measurement quality, the supporting layer may also be in the non-illuminated area, and a reference electrode may be attached to the supporting layer in the non-illuminated area as in FIGS. 7a and 7b. Specifically, the supporting layer 19 may be in the fixed area 34 only, or also in the actuation areas 32 and 33. The supporting layer 19 in the fixed area 34 may be piezoelectric, pyroelectric or non-pyroelectric. The supporting layer 19 in the actuation areas 32 and 33 may be piezoelectric or non-piezoelectric. The reference electrode 71 may be in the fixed area 34 as in FIG. 7a and 7b, or anywhere in the non-illuminated area 111. The reference electrode 71 may assist in measuring the change of the pyroelectric potential in the piezoelectric or pyroelectric supporting layer 19. As with sensing electrode 61, the portion of the supporting layer 19 in the fixed area 34 may be positioned between the reference electrode 71 and the absorbing reflector layer 14 in the fixed area 34, and the pyroelectric potential may be determined by measuring the current or voltage between them. If the reference electrode 71 is in the non-illuminated area of the absorbing reflector layer 14, the absorption of light by the absorbing reflector 37 may not affect the potential of the reference electrode 71. However, an increase of the external temperature may change this potential. Thus, by comparing the potential of the sensing electrode 61 and the reference electrode, the effect of external temperature may be eliminated.

According to an exemplary aspect, for piezoelectric actuation of the interferometer with electrode-based arrangement for determining the temperature, the supporting layer may be in the actuation area, and said supporting layer may be piezoelectric. Further, the actuator may be piezoelectric, as shown in FIGS. 7a and 7b. Same as in the example illustrated in FIGS. 5a and 5b, the first piezoelectric actuation electrodes 54 and 55 may be attached to each actuation support 52 and 53. The first piezoelectric actuation electrodes 54 and 55 can be made of electrically conductive material, for example, aluminium. The supporting layer 19 may also be in the fixed area 34 as in FIGS. 7a and 7b and may be made from piezoelectric, pyroelectric or non-pyroelectric material. Alternatively, there may be no supporting layer 19 in the fixed area 34.

The absorbing reflector layer 14 in the actuation areas 32 and 33 may be configured as the second actuation electrodes 35 and 36 located on the bottom of the actuator supports 52 and 53. In other words, the actuator supports 52 and 53 are to be between the first piezoelectric actuation electrodes 54 and 55 and the second actuation electrodes 35 and 36 in the vertical direction.

The movement in the actuation areas 32 and 33 in the vertical direction can be activated by applying the voltage between the first piezoelectric actuation electrodes 54 and 55 and the second actuation electrodes 35 and 36. The movement of the actuation areas is the out-of-plane bending in positive or negative z-direction depending on the polarity of the applied voltage. The direction of the movement of the absorbing reflector 37 follows the direction of the movement in the actuation areas 32 and 33.

For electrostatic actuation of the interferometer with electrode-based arrangement for determining the temperature, the actuator may be electrostatic, as shown in FIGS. 6a, 6b and 6c. The reflector 13 and the absorbing reflector layer 14 may form a capacitive actuator in each of the two or more actuator areas 32 and 33. The electrostatic actuation may also be called capacitive actuation. The electrostatic actuator may also be in the interferometer of FIGS. 7a-b. The supporting layer 19 may optionally be attached to the absorbing reflector layer 14 in the actuation areas 32 and 33 and/or in the fixed area 34. The supporting layer 19 in these areas may be made of piezoelectric, pyroelectric or non-pyroelectric material.

According to an exemplary aspect, the reflector 13 may form the first electrostatic actuation electrodes as in FIGS. 6a-c. If the reflector 13 has multiple layers (e.g., Bragg mirror as described below), the topmost layer of it may be used as the electrostatic actuation electrode. The absorbing reflector layer 14 in the actuation areas 32 and 33 may form the second actuation electrodes 35 and 36. The movement in the actuation areas in the vertical direction may be activated by applying the voltage between the second actuation electrodes 35 and 36 and the first electrostatic actuation electrode. The direction of the movement of the absorbing reflector 37 follows the direction of the movement in the actuation areas 32 and 33.

FIGS. 6a, 6b and 6c illustrate the geometries of the interferometer different from the preceding figures according to an exemplary aspect. These alternative geometries may be combined with any embodiment of this disclosure where the actuator is electrostatic. Although the interferometer in FIGS. 6a, 6b and 6c comprises the absorbing reflector support 41 and the sensing electrode 61, such interferometer may also comprise no supporting layer 19, or the supporting layer 19 in the actuation areas 32 and 33 and/or in the fixed area 34. Further, the arrangement for determining the temperature of the absorbing reflector in the interferometer of FIGS. 6a-6c may be the thermistor.

Bragg Mirror

In any embodiment of this disclosure, the reflector may be a Bragg mirror (or Bragg reflector). In general, the Bragg mirror, which can also be called the Bragg reflector, is a structure that comprises an alternating sequence of layers of two different optical materials. The Bragg mirror is configured to improve selectivity and sensitivity of the interferometer and to reduce absorbance so that more light reaches the absorbing reflector. In this disclosure, the Bragg mirror may be comprised of the multiple alternating layers of, for example, silicon and silicon dioxide, deposited onto the top surface of the substrate. The absorbing reflector layer 14 may also be a Bragg mirror wherein the outermost layer that faces the reflector 13 is absorbing. The outermost layer of the said absorbing reflector layer 14 may be metal.

An asymmetrical structure where the reflector is a Bragg mirror, and the absorbing reflector layer is a metal layer has good wavelength selectivity compared to symmetrical structures where both reflectors are metallic. Although either reflector could be metallic in the asymmetrical structure, there is an additional benefit in forming the absorbing reflector layer with a metal layer and the reflector with the Bragg mirror, since the same metal layer may then be used as an electrode for the piezoelectric actuators, and for absorbing and reflecting functionality of the reflector.

It should be appreciated that this exemplary embodiment can be combined with any other exemplary embodiments of this disclosure including any arrangement for determining the temperature or any actuator.

Anti-Reflection Layer

In any exemplary embodiment described herein, the bottom surface of the substrate 11 may comprise an optional anti-reflection layer (not illustrated). The anti-reflection layer may also be called an anti-reflection coating. An optional metallic layer (not illustrated) may be attached to the anti-reflection layer. The metallic layer may comprise an opening (may also be called a bottom aperture) that may be at least partly aligned with the illuminated area 12. The metallic layer may define a region where the incoming light 17 enters the interferometer.

CO$_2$ Detection

According to an exemplary aspect, one practical application of the interferometer with the absorbing reflector is to measure the concentration of the carbon dioxide (CO$_2$) gas. The measurement can be based on determining, from light that has passed through a carbon dioxide sample, the light intensity at different wavelengths. CO$_2$ has strong absorption peak at wavelength of 4.2-4.3 um. By measuring the absorption at this wavelength range, the gas concentration can be determined. In practical applications, however, the measurement of light absorption at one wavelength alone is not sufficiently stable due to variations in IR light source output and detector sensitivity. To maintain accuracy, it is necessary to compare absorption at two or more different wavelengths. By comparing the absorption at different wavelengths, the sensor drift can be calibrated.

IR Detection Method

In this disclosure, a method is provided for detecting the infrared light with the described interferometer. In this aspect, the method includes illuminating the absorbing reflector so that the infrared light enters from the bottom surface of the substrate to the bottom side of absorbing reflector; and determining the temperature of the absorbing reflector.

By comparing the intensity of the IR absorbed light before and during the supply of $CO_2$ gas, the concentration of the gas presence can be determined. The less IR light is absorbed by the absorbing reflector, the greater concentration of $CO_2$ is. Further, the actuator may be used to adjust the gap between the reflector and the absorbing reflector so that the measurement can be repeated at different wavelength to compare the absorption at different wavelengths and calibrate the sensor drift.

$CO_2$ Gas Sensor

According to an exemplary aspect, the disclosure further defines a carbon dioxide sensor with the interferometer described above. The $CO_2$ sensor is tuneable: in the integrated interferometer the gap between the reflector and the absorbing reflector may be adjusted using actuator, and different wavelengths of the IR light can be detected. Further, the $CO_2$ sensor requires no additional IR detector: the IR light is absorbed by the absorbing reflector of the interferometer. Thus, the construction and design of the $CO_2$ sensor is simplified.

Manufacturing Method

A method for manufacturing the interferometer illustrated in FIGS. 1, 3a-b, 4a-b, 5a-b, 6a-c, and 7a-b may comprise depositing a layer of reflector material on the surface of a substrate, depositing a layer of spacer material on the layer of reflector material, and depositing a layer of absorbing reflector material on the layer of spacer material. Optionally, the method includes placing a layer of supporting material on the layer of absorbing reflector material. Moreover, the method includes depositing and patterning electrically conductive layers to form the thermistor 31 or the sensing 61 and/or reference 71 electrodes. If the actuator is piezoelectric, depositing a layer of electrically conductive electrode material on the layer of supporting material (piezoelectric material when actuator is piezoelectric), patterning the layer of electrode material so that it is present at least in the two or more actuation areas. Patterning the layer of absorbing reflector material and the layer of supporting material (if present) so that it forms elongated actuation parts in two or more actuation areas 32 and 33 on the interferometer, wherein each of the two or more actuation areas extends from the fixed area 34 to the illuminated area 12, and wherein the fixed ends of the actuation parts are attached to the fixed area 34. Then removing the layer of spacer material from the illuminated area 12 and the two or more actuation areas 32 and 33 to release the actuators and the absorbing reflector from surrounding fixed structures. The actuators thereby become flexible suspenders that support the weight of the absorbing reflector and enable the absorbing reflector to be moved in the z-direction, as described above.

FIG. 8 illustrates an alternative interferometer with piezoelectric supporting layer 19 according to an exemplary aspect. The interferometer in FIG. 8 also comprises a silicon wafer 81 on top of the layer of piezoelectric supporting material 19. The layer of piezoelectric supporting material 19 may first be deposited on the silicon wafer 81 and the wafer may then be bonded to the substrate 11 and to the layers on top of the substrate. The thickness of the piezoelectric supporting layer 19 in the z-direction may be less than the thickness of the silicon wafer 81 in the z-direction. Additionally, one or more layers of conductive material (not shown in FIG. 8), such as metal, may be deposited on the piezoelectric supporting material 19. Thus, one or more layers of conductive material may be between the layer of piezoelectric supporting material 19 and the absorbing reflector layer 14. For example, the thermistor (not illustrated in FIG. 8) may be on the piezoelectric supporting material 19 and attached to the absorbing reflector 37. Alternatively, the thermistor may be on the silicon wafer 81 and attached to the piezoelectric supporting material 19. It should be appreciated that the working principle of the thermistor is the same as was described in the previous examples above.

As illustrated in FIG. 8, both the silicon wafer 81 and the piezoelectric supporting layer 19 may be patterned in the illuminated area 12 and the two or more actuation areas 32 and 33 so that elongated piezoelectric actuators are formed in each actuation area. The parts of the silicon wafer 84 and 85 that lie in the two or more actuation areas 32 and 33 may be used as the actuation electrodes in the piezoelectric actuator. In FIG. 8, the layer of piezoelectric supporting material 19 extends to the fixed area 34, but it may alternatively be omitted from this area.

For the measurement of the pyroelectric potential induced by the absorption in the absorbing reflector 37 in the embodiment of FIG. 8, the absorbing reflector 37 may be used as the bottom electrode, and the part of the silicon wafer 82 in the illuminated area 12 may be used as the top electrode. The pyroelectric potential may be sensed by measuring the charge or current between the top and the bottom electrodes. For the reference measurement, the part of the silicon wafer 83 in the fixed are 34 may be used as the top electrode and the part of the absorbing reflector layer 14 in the fixed area 34 may be used as the bottom electrode.

Another exemplary embodiment of the interferometer with the silicon wafer 81 on top of the layer of the piezoelectric supporting material 19 is illustrated in FIG. 9. In this example, the absorbing reflector layer 14 may be only in the illuminated area 12. The reflector 13 may be a Bragg mirror in this aspect. The conductive electrodes 91 and 92 may be attached to the piezoelectric supporting material 19 in the actuator areas 32 and 33. The parts of the silicon wafer 84 and 85 and the conductive electrodes 91 and 92 may be used to initiate movement in the actuation areas 32 and 33. Additional conductive layers 93 and 94, attached to the piezoelectric supporting material 19, and conductive layers 95 and 96, attached to the reflector 13 (or the topmost layer if the reflector Bragg mirror), may be in the fixed area 34. Conductive layers 95 and 96 may form electrical connection with circuitry on the reflector 13. In other words, these are control electrodes, and the signals that are used to control the interferometer can be brought to the interferometer through them.

In general, it is noted that the exemplary embodiments described above are intended to facilitate the understanding of the present invention and are not intended to limit the interpretation of the present invention. The present invention may be modified and/or improved without departing from the spirit and scope thereof, and equivalents thereof are also included in the present invention. That is, exemplary embodiments obtained by those skilled in the art applying design change as appropriate on the embodiments are also included in the scope of the present invention as long as the obtained embodiments have the features of the present invention. For example, each of the elements included in each of the embodiments, and arrangement, materials, conditions, shapes, sizes, and the like thereof are not limited to those exemplified above and may be modified as appropriate. It is to be understood that the exemplary embodiments are merely illustrative, partial substitutions or combinations of the configurations described in the different embodiments are possible to be made, and configurations obtained by such substitutions or combinations are also included in the scope of the present invention as long as they have the features of the present invention.

What is claimed:

1. An interferometer comprising:
   a substrate having a top surface and a bottom surface that oppose each other, the substrate being at least partly transparent;
   a reflector on the top surface of the substrate in an illuminated area where incoming electromagnetic radiation is passed through the substrate from the bottom surface to the top surface of the substrate;
   an absorbing reflector layer above the reflector and that is parallel to the reflector and faces the reflector in the illuminated area, the absorbing reflector layer including a top and a bottom surface that oppose each other, and the absorbing reflector layer being formed of a thin metal film configured to absorb at least some wavelengths of the electromagnetic radiation;
   an arrangement configured to determine a temperature of the absorbing reflector layer; and
   an actuator in an actuation area that is configured to adjust a gap between the reflector and the absorbing reflector layer.

2. The interferometer according to claim 1, wherein the arrangement comprises a thermistor.

3. The interferometer according to claim 2, wherein the thermistor is attached to the top surface of the absorbing reflector layer in the illuminated area.

4. The interferometer according to claim 2, further comprising a supporting layer that is attached to the top surface of the absorbing reflector layer at least in the illuminated area, with the thermistor being attached to the supporting layer in the illuminated area.

5. The interferometer according to claim 4, wherein the supporting layer is at least in the actuation area.

6. The interferometer according to claim 5, wherein the supporting layer is a piezoelectric layer.

7. The interferometer of claim 5, wherein the supporting layer is pyroelectric and is attached to the absorbing reflector layer at least in the illuminated area.

8. The interferometer according to claim 5, further comprising:
   a portion of a silicon wafer,
   wherein:
      the supporting layer is deposited on the portion of the silicon wafer; and
      the portion of the silicon wafer with the supporting layer is bonded to the substrate with the supporting layer holding the absorbing reflector layer.

9. The interferometer according to claim 8, wherein:
   the supporting layer is a piezoelectric layer that is elongated from the illuminated area to at least two actuation areas on opposite sides of the illuminated area; and parts of the absorbing reflector layer are configured to be electrodes for actuators in the at least two actuation areas.

10. The interferometer according to claim 1, wherein the actuator is a piezoelectric material.

11. The interferometer according to claim 1, wherein the actuator is electrostatic.

12. The interferometer of claim 7, wherein the arrangement comprises a sensing electrode that is attached to the supporting layer in the illuminated area.

13. The interferometer of claim 12, wherein the supporting layer is also in a non-illuminated area, and a reference electrode is attached to the supporting layer in the non-illuminated area.

14. The interferometer according to claim 12, wherein the supporting layer is in the actuation area and the supporting layer is a piezoelectric layer.

15. The interferometer according to claim 12, wherein the actuator is a piezoelectric material.

16. The interferometer according to claim 12, wherein the actuator is electrostatic.

17. The interferometer according to claim 1, wherein the reflector is a Bragg mirror.

18. A carbon dioxide sensor comprising the interferometer of claim 1.

19. An interferometer comprising:
   a substrate that is at least partly transparent;
   a reflector on the substrate in an illuminated area where incoming electromagnetic radiation is passed through the substrate;
   an absorbing reflector layer that is parallel to the reflector and faces the reflector in the illuminated area, the absorbing reflector layer being formed of a thin metal film configured to absorb at least some wavelengths of the electromagnetic radiation;
   an arrangement configured to determine a temperature of the absorbing reflector layer; and
   an actuator configured to adjust a gap between the reflector and the absorbing reflector layer.

20. The interferometer according to claim 19, wherein the arrangement comprises a thermistor that is attached to the absorbing reflector layer in the illuminated area.

21. The interferometer according to claim 20, further comprising a supporting layer that is attached to the absorbing reflector layer at least in the illuminated area, with the thermistor being attached to the supporting layer in the illuminated area.

22. A method for detecting infrared light with an interferometer that includes a partly transparent substrate, a reflector on the substrate in an illuminated area where incoming electromagnetic radiation is passed through the substrate, an absorbing reflector layer above the reflector and being formed of a thin metal film configured to absorb at least some wavelengths of the electromagnetic radiation, an arrangement configured to determine a temperature of the absorbing reflector layer, and an actuator configured to adjust a gap between the reflector and the absorbing reflector layer, the method comprising:
   illuminating the absorbing reflector layer so that the infrared light enters from a bottom surface of the substrate to a bottom side of absorbing reflector layer; and
   determining the temperature of the absorbing reflector layer.

* * * * *